Aug. 2, 1966  L. A. McCUTCHEON  3,263,347
EDUCATIONAL AND RECREATIONAL LESSON-AIDS AND GAMES WITH EASEL
Filed Feb. 20, 1964  3 Sheets-Sheet 1

INVENTOR
LULU A. McCUTCHEON
BY Rommel, Allwine & Rommel
ATTORNEYS

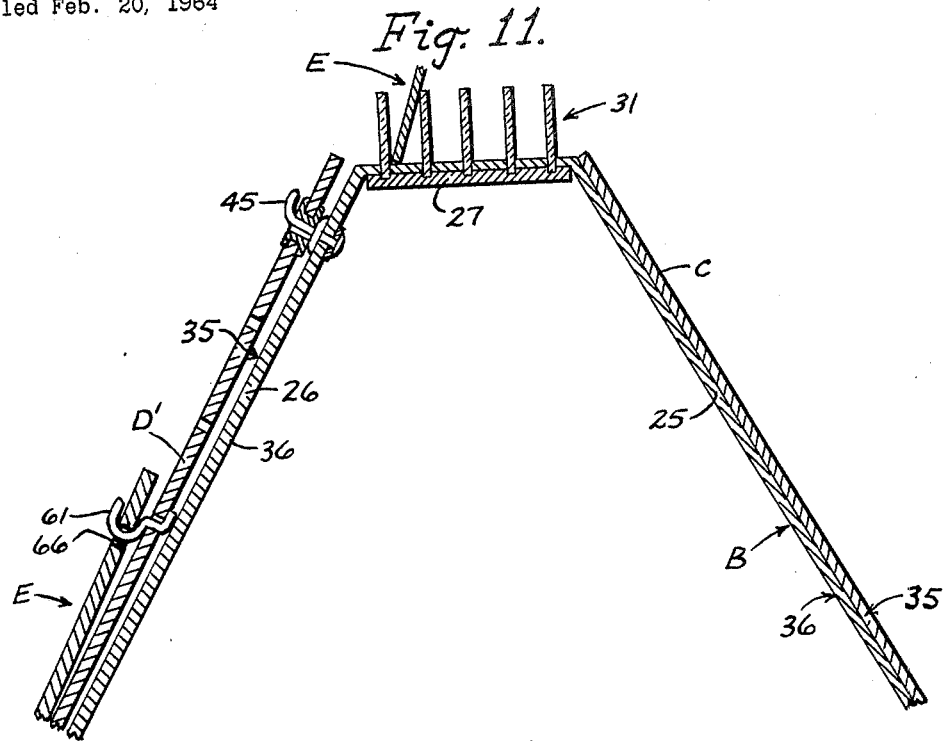
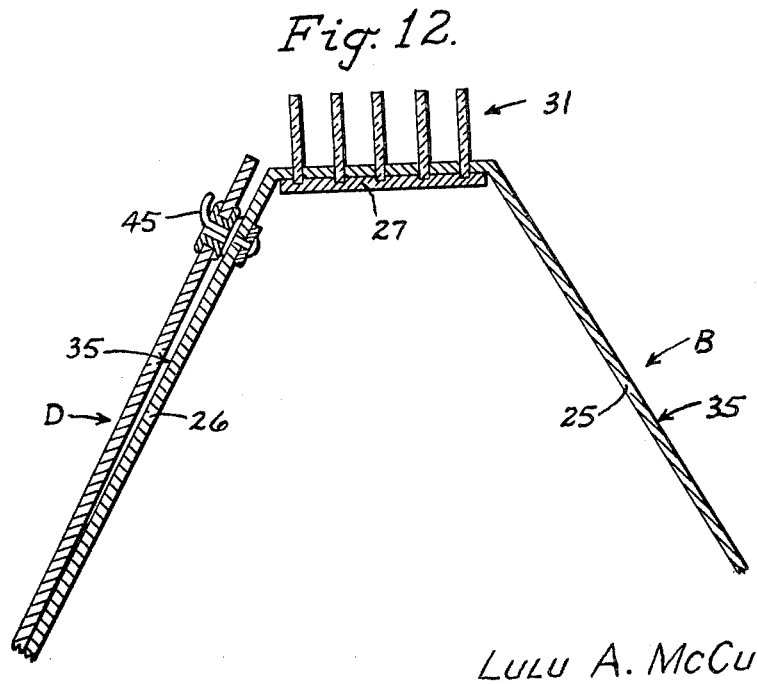

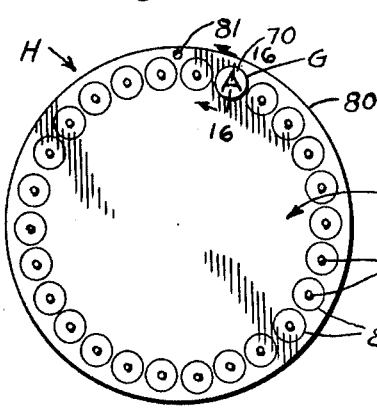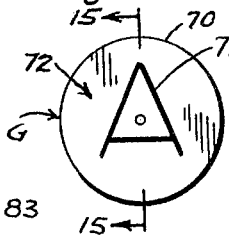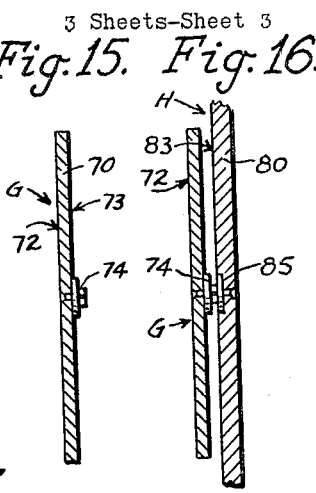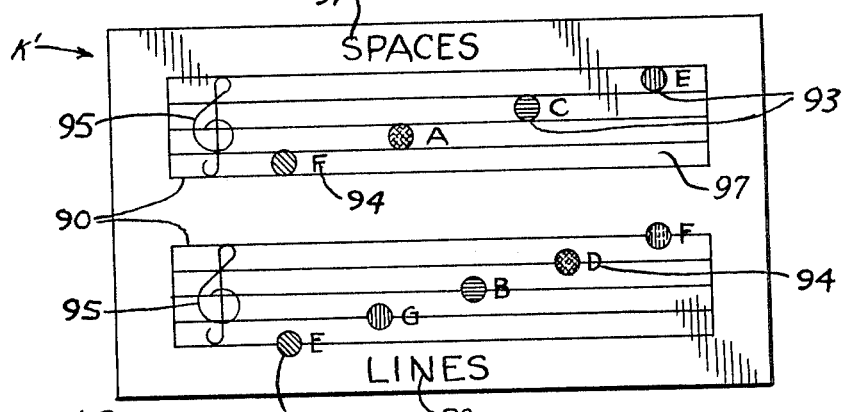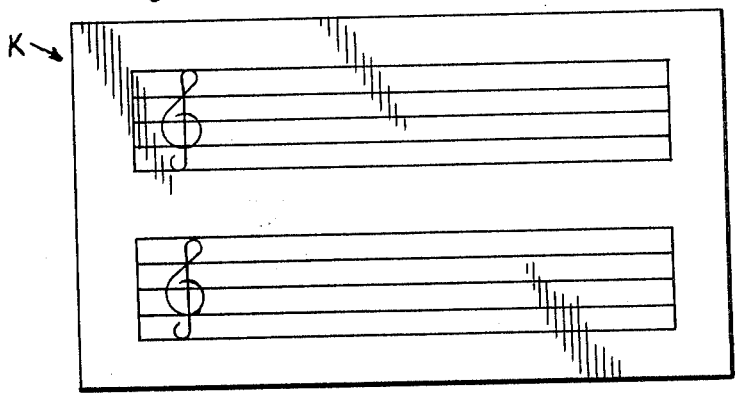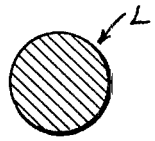

United States Patent Office 3,263,347
Patented August 2, 1966

3,263,347
EDUCATIONAL AND RECREATIONAL LESSON-AIDS AND GAMES WITH EASEL
Lulu A. McCutcheon, P.O. Box 323, Oakland, Calif.
Filed Feb. 20, 1964, Ser. No. 346,235
2 Claims. (Cl. 35—60)

This invention relates to educational and recreational lesson aids and pixx games. More particularly it relates to game apparatus for playing so-called educational games which incorporate both mental and manual processes on the part of the players.

An important object of the invention is to provide game-playing apparatus which includes support structures, indicia-bearing members and indicia-receiving members to be supported by the support structures, and the indicia-receiving members adapted to removably receive indicia supplied by some of the indicia-bearing members.

Another important object of the invention is to provide game apparatus which includes a supporting structure carrying movable indicia-receiving means, the indicia being supplied by movable game-playing members which are adapted to be positioned upon the indicia-receiving means and not removed therefrom, nor moved over the indicia-receiving member until the game has been completed. That is, the game-playing members are not moved, after once being positioned on the indicia-receiving member, until the game is completed, as distinguished from game pieces which are moved over a game board from position to position.

A further important object of the invention is to provide game apparatus which is adapted to play a large number of games, such as educational games, involving mental processes in such studies as spelling, mathematics, music, grammar, languages and geography, combined with manual processes which would appeal to students.

An additional important object of the invention is to provide game apparatus which includes a support structure for the support of interchangeable indicia-bearing members and a support for other indicia-bearing members which, after mental processes on the part of the player in order to solve a problem, may be manually affixed to the support structure while the first-mentioned indicia-bearing members are not within the vision of the player, being obscured by the support structure.

Still another important object of the invention is to provide game apparatus having features which will appeal to young and older players, since it is so constructed as to require varied manual operations (not characteristic of conventional games where game pieces are moved progressively from position to position on a game board) after there has been some mental processes activity on the part of the player.

Other objects and advantages of the invention will be apparent during the course of the following detailed description of the invention, taken in connection with the accompanying drawings, formign portions of this disclosure, and in which drawings:

FIG. 11 is an enlarged fragmentary sectional view of the support-structure of FIG. 3 with the structures of FIGS. 4, 6 and 8 mounted thereon.

FIG. 12 is a view similar to FIG. 11 but with the structure of FIG. 5 replacing that of FIG. 6 and the structure of FIGS. 4 and 8 removed.

FIG. 13 is an elevational view of a game-playing indicia-receiving member of preferably circular form, for association with the support structure of FIGS. 1–3 inclusive.

FIG. 14 is an elevational view of a game-playing indicia-bearing member or disc, for association with the member of FIG. 13.

FIG. 15 is a cross sectional view of the disc of FIG. 14, substantially on the line 15—15 of FIG. 14, on an enlarged scale.

FIG. 16 is a fragmentary cross sectional view substantially on the line 16—16 of FIG. 13, with the member or disc of FIGS. 14–15 attached thereto, this being on an enlarged scale.

FIG. 17 is an elevational view of a game-playing indicia-bearing member or panel which may be associated with the member of FIG. 13.

FIG. 18 is an elevational view of an indicia-bearing-and-receiving member or panel for association with the member or panel of FIGS. 13 and/or 17.

FIG. 19 is an elevational view of one of a plurality of small colored discs for association with the member or panel of FIG 18.

Figure 1:
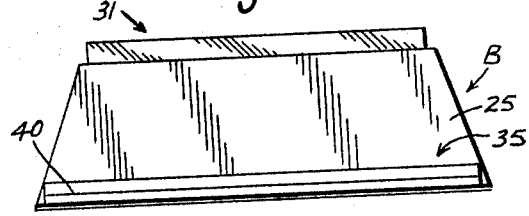
FIG. 1 is an elevational view of one side of a support structure of one form of the invention.

In the drawings wherein for the purpose of illustration are shown examples of the invention, and wherein similar reference characters designate corresponding parts throughout the several views, the letter A may designate an example of the game apparatus; B, a support structure; C, game-playing indicia-bearing movable member or pane; D, game-playing indicia-bearing movable member or panel; D′, game-playing indicia-receiving movable member or panel; E, game-playing indicia-bearing movable members or cards; G, game-playing indicia-bearing movable members, preferably small discs; H, game-playing indicia-receiving member, preferably a large disc; K, game-playing indicia - bearing - and - indicia - receiving member or sheet; K; game-playing indicia-bearing members or sheet; L, game-playing indicia-bearing movable members, preferably small colored discs.

Figure 2:
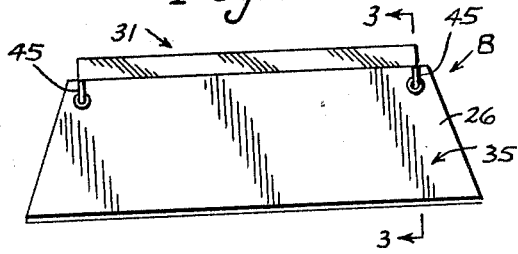
FIG. 2 is an elevational view of the other side of the support structure referred to in FIG. 1.
Figure 3:
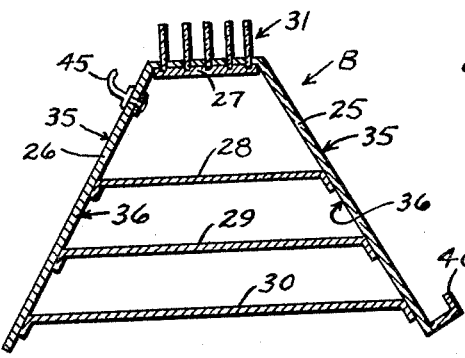
FIG. 3 is a vertical sectional view substantially on the line 3—3 of FIG. 2.

The support structure B is shown, by way of example in FIGS. 1, 2 and 3, as comprising first and second sheets or boards (hereinafter, for convenience, designated as "boards" or "board") 25 and 26 respectively, each providing a support surface; connection and support means 27, 28, 29 and 30, by way of example; and partition means 31. Preferably the support structure B is portable.

As for the boards 25 and 26, they are preferably of sturdy rigid material, as wood, metal or hardened plastic, as also may be the means 20 to 30 inclusive. The boards 25 and 26 are shown, for example, as alike in shape (trapezoidal) extending upwardly, spaced apart and having outer and inner substantially flat faces 35 and 36 respectively; the faces 35 providing the support surfaces.

The first board 25 (FIGS. 1 and 3) is provided with means to movably support a selected indicia-bearing movable member or panel C, and preferably consists of a slideway 40, somewhat L-shaped in transverse section, and extending along the lower portion of the board 25, opening upwardly and secured to the outer face 35 as by adhesives, screws or nails, for example.

The second board 26 (FIGS. 2 and 3) is provided with means to detachably carry a selected base or panel, such as (for example) the members or panels D or D'. This means may be conventional spaced-apart hooks 45 secured to the board 26 at its upper portion and projecting from the outer face 35, with their bights opening upwardly.

The connection and support means 27 to 30 inclusive (FIG. 3) are preferably substantially flat, horizontally-disposed spaced-apart shelves, with the uppermost shelf 27 constituting the top of the support structure B and the others, one below another, providing shelves for game-playing materials, which may include pencils, crayons, chalk, pointers and the like. The shelves may be rigidly secured to the boards 25 and 26 at the inner faces 36 of the boards, as by adhesives, nails or screws, for example, and thus also provide connection means.

The partition means 31 (FIG. 3) may comprise a plurality of spaced-apart upwardly-extending elongate partitions, extending in facing relation, one with respect to another, along the upper face of the means 27, which forms the top of the support structure B, and secured thereto in any approved way. The spaces or compartments between the various partitions are adapted to releasably retain various of the indicia-bearing members or cards E. The outermost partition, adjacent the second board 26, may be of glass or transparent synthetic plastic material for complete visibility of the indicia upon the members or cards E immediately therebehind.

Figure 4:
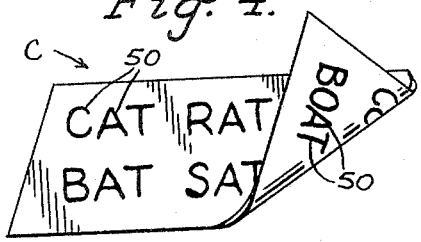
FIG. 4 is an elevational view of an indicia-bearing member or panel for mounting upon the side of the support structure of FIGS. 1 and 3, a corner portion of the member or panel being folded over to reveal a portion of indicia on the other face thereof.

Now with reference to the indicia-bearing movable members or panels C (an example thereof being shown in FIG. 4), the same may be of any suitable material, as stiff paper, cardboard or hardened synthetic plastic material. It bears, on one or both faces indicia 50 relating to the game. This indicia 50 may be, for example, words in the English language or foreign languages, of two or more letters, pictures of animate or inanimate objects. Arabic or Roman numerals, dots and dashes of Morse or other codes, and the like. Consequently, the number of members or panels C may be large and varied as to indicia. The members or panels C are adapted to rest against the outer face 35 of the first board 25 with their lower longitudinal edges within the slideway 40.

Figure 5:
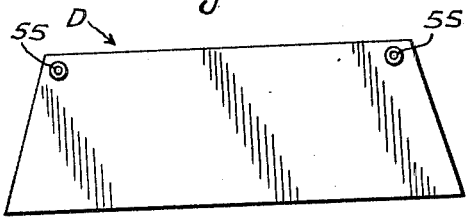
FIG. 5 is an elevational view of one form of an indicia-receiving member or panel for mounting upon the side of the support structure of FIGS. 2 and 3.

With reference to the indicia-receiving movable members or panels D (FIG. 5) and D' (FIG. 6), each comprises a sheet or the like of rigid material. For example, the material of the panel D may be slate or slatelike, or it may be paper or cardboard. The material should be one adapted to receive indicia placed thereon as by lead pencil, crayon, chalk, slate pencil, pen stylus or the like. It may be of various colors or vari-colored. For the purposes of concise definition, I will designate the same as poster board, which descriptive designations is to be construed as covering a panel having the properties above noted. Adjacent its upper portion, the panel D is provided with openings or eyes 55 to receive the hooks 45, whereby the panel D may rest upon the face 35 of the board 26, and be supported by this board.

Figure 6:
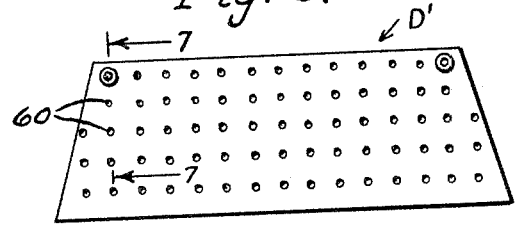
FIG. 6 is an elevational view of another form of an indicia-receiving member of panel.
Figure 7:
FIG. 7 is a fragmentary vertical sectional view of the member or panel of FIG. 6 substantially on the line 7—7 of FIG. 6, but on an enlarged scale.
Figure 8:
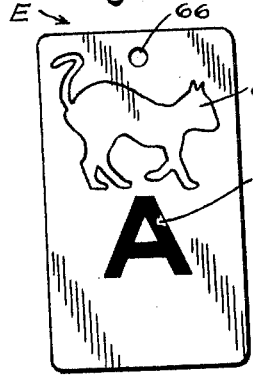
FIG. 8 is an obverse face view of an indicia-bearing member or card for supporting by the member or panel of FIG. 6.
Figure 10:
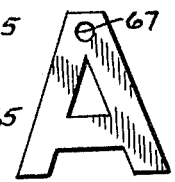
FIG. 10 is a face view of another form of indicia-bearing member differing from that of FIG. 8.
Figure 9:
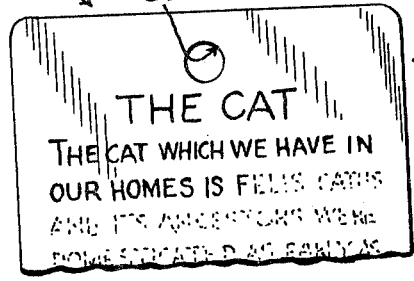
FIG. 9 is a reverse face view of the indicia-bearing member of FIG. 8.

As another indicia-receiving movable member or panel, I may employ the member or panel D' (FIG. 6). This may be one of the so-called peg-boards, i.e., a board having a plurality of spaced-apart sockets 60, extending inwardly from a face thereof and spaced over most of this face. The sockets 60 are adapted to receive the inner ends of conventional hooks 61 with their bights extending outwardly from the sockets and are adapted to receive selected indicia-bearing members or cards (FIGS. 8 to 10). The peg-board and hooks combination permits flexibility in arrangements, whereby the hooks 61 may be positioned as desired. For example, if the indicia 50 upon a face of a member or panel C consists of a number of three-letter words, the hooks 61 may be arranged in groups of three in horizontal rows across the member or panel D'.

The indicia-beaing members or cards E may be, for example, cards shaped like ordinary playing cards but they contain educational indicia 65 on one face, although a portion of the educational indicia may be on the reverse of the cards. For example, each card may contain a letter of an alphabet, a letter of an alphabet and a picture of an object, the name of which contains the specific letter, such as the letter "A" and a picture of a cat. The same card, containing the letter "A" may also contain (as in the lower corner portions) the letters "HA" and "AT" being the middle two letters of the French word, "chat" and the Spanish word "gato" for "cat". The reverse of the member or card E may contain indicia describing the cat, if the picture on the obverse is that of a cat. However, this last indicia may be on the obverse. Of course the indicia 65 may be other than alphabetical letters, as is believed apparent from the foregoing. The indicia may be simply a picture of an animate or inanimate object. In the stead of members like playing cards, the members may be cardboard but having an edge shaped to the edge of an object, as a letter of an alphabet, or of an animate or inanimate object, which may be in black-and-white or suitably colored in natural colors. In each case, it is preferred that, adjacent the upper portion of the member or card E, is a perforation or eye 66 to receive a bight portion of a hook 61. While, for ease in manipulating the members or cards E, the hooks are preferably carried by the panel D', they may be carried by the members or cards E and the appropriate ends of the hooks inserted into the sockets 60.

In playing a game, explained by way of illustration, with the game apparatus A, a player is given a pack of members or cards E which includes members or cards containing indicia for spelling three letter words, including the words included in the indicia 50 upon a selected member or panel C, which is mounted upon the board 25. The player studies the first word (as "cat") then the support structure B is rotated 180° or the player moved to face the board 26 and, if he has grasped the spelling of the word, selects members or cards E containing the letters "C," "A," and "T" and mounts the selected cards E upon three adjacent hooks 61 of the member or panel D' or, taking a suitable scribing instrument, writes the word upon the member or panel D. At this time, the member or panel C is out of his sight. The player will be scored according to how many words on the member or panel C he spells correctly.

Of course, the game may not relate to spelling words, since it may relate, for example, to memorizing the Morse code, with the dot-and-dash indicia upon the member or panel C and the player spelling out the words upon the members or panels D or D'.

Another aspect of the use of the game apparatus A resides in its flexibility such as a game in which the member or panel C contains problems in addition, etc. The members or cards E contain numerals and the player mentally solves the problem and, keeping the answer "in his head" goes to face the board 26 and manually affixes a member or card (or members or cards) E containing indicia representing the answer. For the convenience of small players who may not be able to manipulate a pack of cards readily, the player (or assistant) may place the cards, obverse face forward, in a row in a compartment defined by two of the partitions 31 so that the player may observe them and indicate which members or cards E he desires to use in the answer to a problem.

As a substitute for the indicia-bearing members or cards E as illustrated in FIGS. 8 and 9, I may substitute the form "cut out" shown in FIG. 10, for example, being the indicia 65 in form and provided with attaching eye 67.

FIG. 11 illustrates what has been said as to the functions of the support structure B in conjunction with a member or panel C, member or panel D' and a member or card E.

FIG. 12 illustrates what has been said as to the functions of the support structure B in cooperation with the member or panel D, with the member or panel C also included. As will be subsequently explained, the member or sheet K may be carried by the board 25 as is the member or panel C, and the large disc G may be suspended from a hook 61 of the panel D'.

The indicia-bearing movable member G (FIGS. 14–15) is one example of a plurality of indicia-bearing preferably small discs 70 of paper, cardboard, hardened plastic, wood or the like, preferably shown somewhat enlarged in FIGS. 15 and 16. They may bear, preferably one to a disc, indicia 71, the letters of the alphabet, numerals, dots, mathematical signs for plus, minus, divided by, and multiplied by, or various algebraic signs and symbols, upon their upper faces 72. If desired, they may carry, upon their lower faces 73, means cooperating with the indicia-receiving movable member H, to detachably secure them to the latter. Such may be one portion 74 of a conventional snap fastener carried by the disc 70 and extending from its lower face 73. The snap fastener portion 74 cooperates with the other snap fastener portion 85 of a relatively large disc 80, next described.

The indicia-receiving movable member H (FIG. 13) is preferably a relatively large disc 80 provided with a perforation 81 adjacent its periphery. Its upper face 83 may carry a plurality of spaced-apart circles 84 to receive the discs 70 and their snap fastener portions 74 to cooperate with appropriate snap fastener portions 85 carried by the large disc 80, as may be appreciated in FIG. 16.

An example of how to play a game employing the game apparatus G and H is as follows: The instructor, umpire or person setting up the large disc 80 such as suspended by its eye from a hook 61 of the means D' or mounted in the slideway 40, the player is given a number of the small discs 70. There may be 26 small discs 70, each bearing a different letter of the alphabet. The player will then attempt to arrange them correctly, one after another, upon the large disc 80, in a circle. Or one or more of the small discs may be held back by the instructor or other person who umpires the game, in order to observe whether or not the player will note the absence of the missing disc or discs 70. He will be scored according to his ability to place the small discs correctly.

Older players may attempt to solve mathematical problems after the instructor has placed a suitable number of small discs 70 upon the large disc. Such as small discs bearing the numerals "8" and "7" with the multiplication sign (×) between them. The player will attempt to place the answer next adjacent the numeral "7" with one circle 84 (for example) between the answer and the disc bearing the numeral "7".

I have discovered that games which teach music may be played, employing portions of the game structure hereinbefore described. For example, a game which will teach players the relative positions of the named stave lines and spaces of the musical staff, and information which would be associated therewith.

For the playing of musical games which may include reading and sounding notes and singing on the part of the game players, I prefer to provide in association with the structure B, game-playing indicia-bearing members or sheets K', an example being illustrated in FIG. 17, and which contains indicia, such as the staves 90, the wards "spaces" and "lines" 91 and 92 respectively (representing pitches), a plurality of colored dots 93 (or equivalents) and the adjacent letters 94 as governed by the treble clefs 95. Colored dots 93 (or their equivalent shapes) are shown positioned in the spaces 97. A selected member or sheet K' may be positioned on the board 25 and retained thereon by the slideway 40. The dots of the spaces, reading from bottom to top, are preferably green, orange, blue and red, and those of the staves, green, red, blue, orange and purple.

Associated with the members or sheets K', are game-playing indicia and indicia-receiving support members or sheets K. An example thereof is shown in FIG. 18 and may include all the indicia shown on the member or sheet K' except the colored dots and/or the indicia 94. This member or sheet K is placed in the hands of a player, who supports its, indicia-bearing face upwardly, on a suitable surface and attempts to place correctly thereon the game-playing indicia-bearing small discs or members L, (also placed in the hands of the player) in accordance with the positions of the colored dots 96 (or their equivalent shapes) of the member or sheet K'. The teacher or person umpiring the game may use indicia, which he attaches to the indicia-receiving member H, such as discs G separately bearing the letters "F," "A," "C," "D," and "G," to "prompt" or otherwise interest the player to increase the player's efforts to score. Of course a portion of the interest may be increased by the teacher or umpire, pointing to the letters "F," etc., mentioned above, while the players sing out the letters in a selected key.

As an alternate arrangement, I may place the indicia, which appears on the member or panel K', in the central portion of the preferably large circular panel or member H, or on the members or cards H, one example thereof being shown in FIGS. 8 and 9.

The game-playing components herein disclosed, when used in playing games, tend to stimulate quick thinking and acting on the part of the players, since the players must observe the problem (memorize the indicia upon the member C, for example) and then manually attempt to solve the problem in the shortest time (reproduce on the member D', for example, by the use of selected of the members E, the indicia which he had attempted to memorize from the member C, by mounting the selected members E in their proper order upon the member D'). If he does this correctly and in the least time, his score is highest. Or, as another example, employ the support structure B with the member D', H, K, and L, together with the members E and G. Or, employ the components B, G, H, K', K and L.

The member H may be used in connection with various indicia for speed contests.

Various changes in the size, shape and arrangement of parts may be made to the form of invention herein shown and described, without departing from the spirit of the invention or scope of the claims.

I claim:

1. Educational and recreational game apparatus including support means comprising an easel having a pair of spaced apart upwardly converging side portions, each of said side portions having an outer face, the outer face of one of said side portions facing away from the outer face of the other of said side portions, one of said outer faces including a sideway for removably supporting game materials and the other of said outer faces including a plurality of hook-like members for detachable interconnection therewith of game materials, a plurality of game material receiving shelves attached to and extending horizontally between said side portions of said easel, and a plurality of vertically extending members attached adjacent the uppermost portion of said easel and extending between said side portions in juxtaposition whereby to form a plurality of parallel elongated slots for receiving game material adjacent the uppermost ends of each of said side portions.

2. Educational and recreational game apparatus as specified in claim 1 wherein the vertically extending partition adjacent each of said outer faces of said side portions is transparent for facile viewing of the game materials contained therein.

References Cited by the Examiner

UNITED STATES PATENTS

| | | | |
|---|---|---|---|
| 115,349 | 5/1871 | Palm | 35—60 |
| 266,628 | 10/1882 | Hyde | 35—73 X |
| 375,095 | 12/1887 | Pollard | 35—74 |
| 489,027 | 1/1893 | McDonald | 35—74 X |
| 1,045,317 | 11/1912 | Musil | 211—55 |
| 1,374,269 | 4/1921 | Wilson | 211—55 |
| 1,384,172 | 7/1921 | Raque | 35—35.8 X |
| 1,755,853 | 4/1930 | Waring | 35—71 X |
| 1,903,936 | 4/1933 | Nunnery | 211—55 X |
| 1,945,398 | 1/1934 | Gregg | 35—35 X |
| 1,962,504 | 6/1934 | Hauptle | 211—135 X |
| 1,989,216 | 1/1935 | Shaw et al. | 35—60 |
| 2,474,447 | 6/1949 | Wheelock | 35—73 |
| 2,867,045 | 1/1959 | Millgate | 35—73 X |
| 2,867,917 | 1/1959 | Carlton | 35—35 |
| 3,137,967 | 6/1964 | Flieth | 35—73 X |
| 3,173,386 | 3/1965 | Magers | 211—55 X |

FOREIGN PATENTS 162,102  1/1949  Austria.

EUGENE R. CAPOZIO, *Primary Examiner.*

HARLARD S. SKOGQUIST, *Assistant Examiner.*